US012756595B2

(12) United States Patent
Bera et al.

(10) Patent No.: US 12,756,595 B2
(45) Date of Patent: Oct. 6, 2026

(54) SYSTEM FOR DEPLOYMENT OF THE TWO-WAY RELAY NETWORK INVOLVING ITERATIVE VARIATIONAL BAYESIAN INFERENCE BASED CHANNEL ESTIMATION AND A METHOD THEREOF

(71) Applicant: THE INDIAN INSTITUTE OF TECHNOLOGY KHARAGPUR, West Bengal (IN)

(72) Inventors: Soumyasree Bera, West Bengal (IN); Debarati Sen, West Bengal (IN); Amit Kumar Dutta, West Bengal (IN)

(73) Assignee: THE INDIAN INSTITUTE OF TECHNOLOGY KHARAGPUR, West Bengal (IN)

( * ) Notice: Subject to any disclaimer, the term of this patent is extended or adjusted under 35 U.S.C. 154(b) by 211 days.

(21) Appl. No.: 18/412,713

(22) Filed: Jan. 15, 2024

(65) Prior Publication Data

US 2024/0406030 A1 Dec. 5, 2024

(30) Foreign Application Priority Data

May 30, 2023 (IN) ............................ 202331037349

(51) Int. Cl.
*H04L 25/02* (2006.01)
*H04B 7/185* (2006.01)

(52) U.S. Cl.
CPC ..... *H04L 25/0202* (2013.01); *H04B 7/18519* (2013.01)

(58) Field of Classification Search
None
See application file for complete search history.

(56) References Cited

U.S. PATENT DOCUMENTS 9,948,377 B1 * 4/2018 Kim .................... H04B 7/0617
2023/0033786 A1 * 2/2023 Rachid ............... H04L 25/0202

FOREIGN PATENT DOCUMENTS

WO WO-2019149353 A1 * 8/2019 .......... H04B 7/0413

OTHER PUBLICATIONS

He et al., "Sub-6 GHz V2X-Assisted Synchronous Millimeter Wave Scheduler for Vehicle-to-Vehicle Communications," in IEEE Transactions on Vehicular Technology, vol. 71, No. 11, pp. 11717-11728, Nov. 2022.

(Continued)

*Primary Examiner* — Christine T Duong
(74) *Attorney, Agent, or Firm* — Williams Mullen; F. Michael Sajovec

(57) ABSTRACT

The present invention discloses a system for deployment of two-way relay network (TWRN) comprising at least two transceivers engaged in communication and at least one relay node for establishing communication between said two transceivers. The transceivers involve simultaneous pilot transmission by transmitting pilot signals towards the relay node which are received by relay node after corrupted by respective channels between the relay node transceivers and the relay node estimates the channels by involving iterative variational Bayesian inference (IVBI) based channel estimator and forward back estimated channel state information (CSI) to transceivers for data transmission therebetween.

4 Claims, 8 Drawing Sheets

(56) References Cited

OTHER PUBLICATIONS

Figure 1:
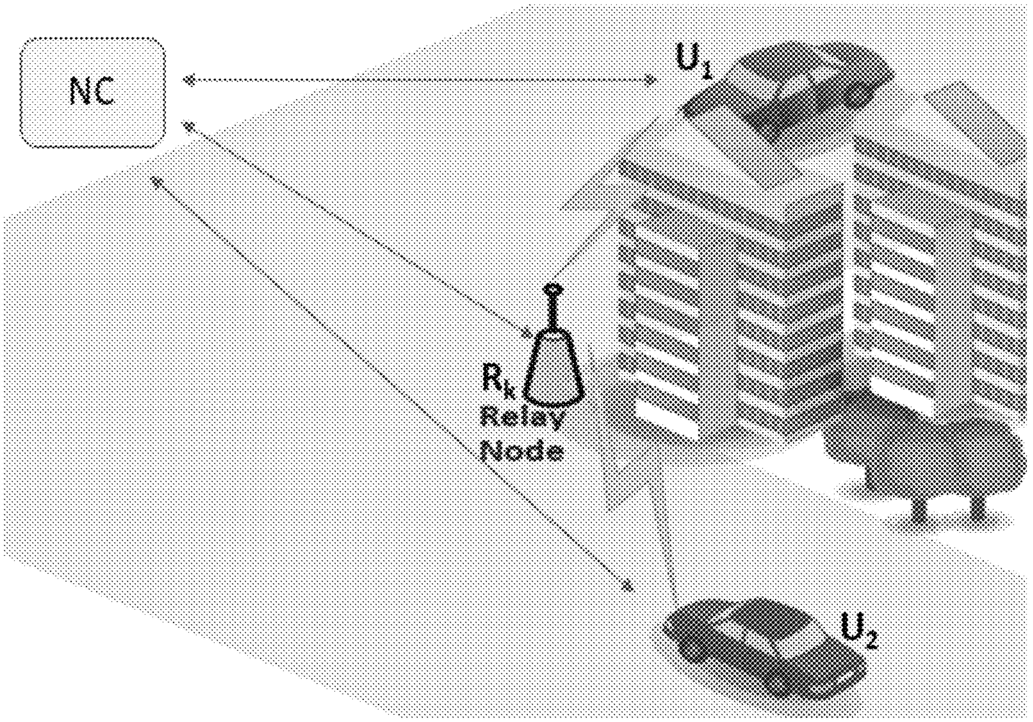

Zugno, et al., "Toward Standardization of Millimeter-Wave Vehicle-to-Vehicle Networks: Open 16 Challenges and Performance Evaluation," in IEEE Communications Magazine, vol. 58, No. 9, pp. 79-85, Sep. 2020.

Montero et al., L. Jofre, "Beam management for vehicle-to-vehicle (V2V) communications in millimeter wave 5G," in Vehicular Communications, vol. 34, 2022.

Lee, et al., "Channel Estimation via Orthogonal Matching Pursuit for Hybrid MIMO Systems in Millimeter Wave Communications," in IEEE Transactions on Communications, vol. 64, No. 6, pp. 2370-2386, Jun. 2016.

* cited by examiner

SYSTEM FOR DEPLOYMENT OF THE TWO-WAY RELAY NETWORK INVOLVING ITERATIVE VARIATIONAL BAYESIAN INFERENCE BASED CHANNEL ESTIMATION AND A METHOD THEREOF

CROSS-REFERENCE TO RELATED APPLICATION

This application is based on international Indian patent application No. IN202331037349 filed on May 30, 2023, the entire disclosures of which are incorporated herein by way of reference.

FIELD OF THE INVENTION

The present invention relates to two-way relay network (TWRN). More specifically, the present invention is directed to deployment of the two-way relay network (TWRN) in millimeter wave (mmWave) band for supporting data hungry applications with improve coverage, network throughput, and reliability. The potential is alleviated by enabling beamformation using large-scale multiple antenna architecture with hybrid precoding structures and reduced radio frequency chains. The amalgamation of the inherent self-interference of TWRN in collusion with sparse mmWave structure with hybrid precoding imposes severe challenges in acquiring accurate CSI. Therefore, for enhancing the deployment performance of the system a novel iterative variational Bayesian inference-based channel estimation scheme is proposed.

BACKGROUND OF THE INVENTION

The rapid development of wireless technologies, smart vehicles, vehicular networks and their applications have already emerged in modern era leading to the escalation in mobile traffic and the need for real-time communications like road traffic reports, popular content distribution, etc. As a result, through the vehicle-to-infrastructure (V2I) communication, edge computing devices (ECD) deliver locally captured contents to vehicles.

The scalability of the network is enhanced by using vehicles as relays to disseminate contents via vehicle-to-vehicle communications (V2V). Moreover, the increasing number of on-road vehicles demands a wireless based safety system in terms of throughput and coverage. Therefore, relay-assisted wireless systems have great potential to meet these requirements, especially in areas where local base stations cannot transmit signals. Further, as a tool to support communication infrastructure in battlefields, sporting events, etc., unmanned aerial vehicles (UAVs) have drawn much attention. In light of this, a UAV and relay-based communication system are envisaged as promising solution that relies on a UAV to function as a wireless relay for two-way communication. Relay based wireless system also have a significant impact on applications like Internet of Things (IoT) and device-to-device (D2D) communications. For IoT connectivity, utilization of long-term evolution-advanced (LTE-A) leads to consumption of high energy, thus preventing the deployment of large-scale IoT over cellular networks. Through multihop relaying, wireless network coverage can be increased and energy consumption can be reduced. Therefore, relay shows its promising contribution for different applications discussed previously in order to improve coverage, network throughput, and reliability of wireless communication systems. Furthermore, the increased number of users for applications mentioned above, implies paradigm shift towards millimeter wave (mmWave) technology which supports significant amount of unused or moderately used bandwidths (20-100 GHz available for communication) to serve the bandwidth hungry internet services in 5G and B5G technology.

However, mmWave system is still very sensitive to blockage and expected to be deployed in line-of-sight (LoS) dominant scenarios. Hence, usage of relaying in mmWave is one of the solutions to prolong the transmission range, improve the throughput and transmission reliability of the networks and there has been a need for an improved millimeter wave (mmWave) technology for deploying in relay network to enhance network coverage, throughput, and reliability or 5G and beyond communication in applications like cellular communication, V2V, IoT etc.

OBJECT OF THE INVENTION

It is thus the basic object of the present invention is to develop a system and method for deployment of the two-way relay network (TWRN) in millimeter wave (mmWave) band for supporting data hungry applications with improve coverage, network throughput, and reliability.

Another object of the present invention is to develop a system and method for deploying an efficient TWRN to enhance network coverage, throughput, and reliability of 5G and beyond, V2V, IoT, cellular communication etc. applications.

Yet another object of the present invention is to develop a channel estimation method for the TWRN that formulates the channel estimation for sparse mmWave channel in presence of self-interference caused due to full-duplexing mode of TWRN operation.

A still further object of the present invention is to develop a synchronized communication framework where the network controller monitors the communication involving relay nodes and user nodes.

SUMMARY OF THE INVENTION

Thus, according to the basic aspect of the present invention there is provided a system for deployment of two-way relay network (TWRN) comprising

- at least two transceivers (100, 300) engaged in communication; and
- at least one relay node (200) for establishing communication between said two transceivers (100, 300);
- wherein said transceivers (100, 300) involves simultaneous pilot transmission by transmitting pilot signals towards the relay node (200) which are received by relay node (200) after corrupted by respective channels between the relay node (200) transceivers (100, 300); and
- said relay node (200) estimates the channels by involving iterative variational Bayesian inference (IVBI) based channel estimator and forward back estimated channel state information (CSI) to transceivers (100, 300) for data transmission therebetween.

In the present system, the transceiver (100, 300) includes

- a pilot module having a pilot signal generator; and
- a data module having
  - a transmitter section involving user data generation followed by data precoding for hybrid beam formation by precoders and combiners which are designed following a hybrid analog and digital architecture, a receiver section for combining received beamformed signal followed by the data detection.

In the present system, the relay node (200) includes a channel estimation module for channel estimation following the IVBI method in order to generate the CSI; and a data module to handles the data signals transmitted by the transceivers (100, 300) following the hybrid beamforming structure, whereby on reception of data signals from the transceivers (100, 300), the relay node (200) performs combing followed by precoding and retransmits the effective signal towards the transceivers (100, 300).

In the present system, the IVBI based channel estimator estimates the channels between the transceivers and the relay node by adopting alternative minimization method for channel estimation, in which, one particular channel is estimated considering the other channel to be known and vice versa.

In the present system, the transceivers (100, 300) are disposed on two vehicles ($U_1$ and $U_2$) wants to communicate with each other and the relay nodes (200: $R_k$, k=1, 2, . . . , K,) are present at road-side, whereby each relay node follows the estimation of mmWave channels between the vehicles $U_1$, $U_2$ and the relay $R_k$ and thereby CSI forwarding (EF) protocol.

In the present system, the nodes are equipped with multiple antennas for transmission and reception.

According to another aspect in the present invention there is provided a method for deploying two-way relay network (TWRN) involving the above system comprising involving at least two transceivers (100, 300) engaged in communication; and involving at least one relay node (200) for establishing communication between said two transceivers (100, 300);

transmitting pilot signals by the transceivers (100, 300) towards the relay node (200) and receiving the pilot signals by the relay node (200) after corrupted by respective channels between the relay node (200) transceivers (100, 300); and estimating the channels by the relay node (200) by involving iterative variational Bayesian inference (IVBI) based channel estimator and forwarding back estimated channel state information (CSI) to the transceivers (100, 300) for data transmission therebetween.

According to another aspect in the present invention there is provided a method for establishing vehicle to vehicle communication involving the above system comprising involving transceiver nodes of the first vehicle ($U_1$) for searching for a nearby relay node ($R_k$) in order to establish communication;

receiving acknowledgement from the nearby relay node ($R_k$) by the transceiver nodes of the first vehicle ($U_1$) and thereby completing handshaking between $R_k$ and $U_1$;

involving said relay node ($R_k$) for searching transceiver nodes of the second vehicle ($U_2$) and thereby handshaking between $R_k$ and $U_2$;

involving the relay node ($R_k$) to send a signal to the transceiver nodes of the vehicles ($U_1$ and $U_2$) indicating start of communication and passing said signal to network controller (NC);

generating and communicating orthogonal pilot signals to the transceiver nodes of the vehicles ($U_1$ and $U_2$) enabling both the nodes ($U_1$ and $U_2$) to initiate simultaneous transmission of the pilot signals towards the relay node ($R_k$);

receiving the superimposed pilot signals by the relay node ($R_k$) which corrupted in channels ($H_{1_k}$, $H_{d_k}$) between nodes $U_1$ and $R_k$ and $U_2$ and $R_k$ and noise therebetween;

iterative variational Bayesian inference (IVBI) based estimation of the channels ($H_{1_k}$ and $H_{d_k}$) and dissemination of the estimated channel state information (CSI) to the nodes ($U_1$ and $U_2$);

receiving respective CSI by the nodes ($U_1$ and $U_2$.) designing precoders and combiners therein based on the received CSI;

initiating the nodes ($U_1$ and $U_2$) for data transmission phase by generating their respective data followed by precoding, whereby the precoded data are transmitted simultaneously by the nodes ($U_1$ and $U_2$) towards the relay node;

reception of superimposed beamformed data at the relay node ($R_k$) which processes the superimposed data with the combiner followed by precoder in order to retransmit the beamformed data signal towards the nodes ($U_1$ and $U_2$);

receiving the superimposed beamformed data signal transmitted by the ($R_k$) at the nodes ($U_1$ and $U_2$), whereby each node ($U_1$ and $U_2$) applies corresponding combiners and detects their respective desired data.

In the method as claimed in claim 8, wherein the IVBI based estimation of the channels ($H_{1_k}$ and $H_{2_k}$) operates based on relay nodes information on the transmitted pilot signals $$X_1^P, X_2^P$$

and corresponding array steering vectors, whereby the channel estimation includes initializing the estimated channel $$\hat{H}_{1_k}^{[0]}$$

through iterative process of iteration length, I;

removal of effect $$X_1^p$$

from the received pilot signal, $$Y_{R_k}^p$$

with the help of $$\hat{H}_{1_k}^{[0]}$$

followed by computation of dictionary matrix of $U_2$;

involving the dictionary matrix and the effective received pilot signal to update posterior distribution of the channel gain for $$\hat{H}_{2_k}^{[i]}$$

based-on updated posterior distribution of hyperparameters iteratively until convergence is achieved and once convergence is achieved, the $i^{th}$ estimate $$\hat{H}_{2_k}^{[i]}$$

is obtained;

removing impact of $$X_2^p$$

from received pilot signal, $$Y_{R_k}^p$$

using the estimated $$\hat{H}_{2_k}^{[i]};$$

calculating the dictionary matrix for $U_1$ and involving the dictionary matrix and the effective received pilot signal to evaluates the updated posterior distribution of channel gain $$\hat{H}_{1_k}^{[i]}$$

$\hat{H}_{1k}^{[i]}$ followed updating the posterior distribution of the hyperparameters and repeating process until convergence and after convergence, the $i^{th}$ estimate the channel $$\hat{H}_{1_k}^{[i]}$$

$\hat{H}_{1k}^{[i]}$ is obtained;

updating previous estimates for both the channels using the current estimates i.e.

$$\hat{H}_{2_k}^{[i+1]} = \hat{H}_{2_k}^{[i]}$$

and $$\hat{H}_{1_k}^{[i+1]} = \hat{H}_{1_k}^{[i]};$$

forwarding the final estimated channels $\hat{H}_{1_k}$ and $\hat{H}_{2_k}$ to the nodes ($U_1$ and $U_2$) using control channel for subsequent initiation of the transmission of the actual data phase.

BRIEF DESCRIPTION OF THE ACCOMPANYING DRAWINGS

FIG. 1. Illustration of the proposed system.

Figure 2:
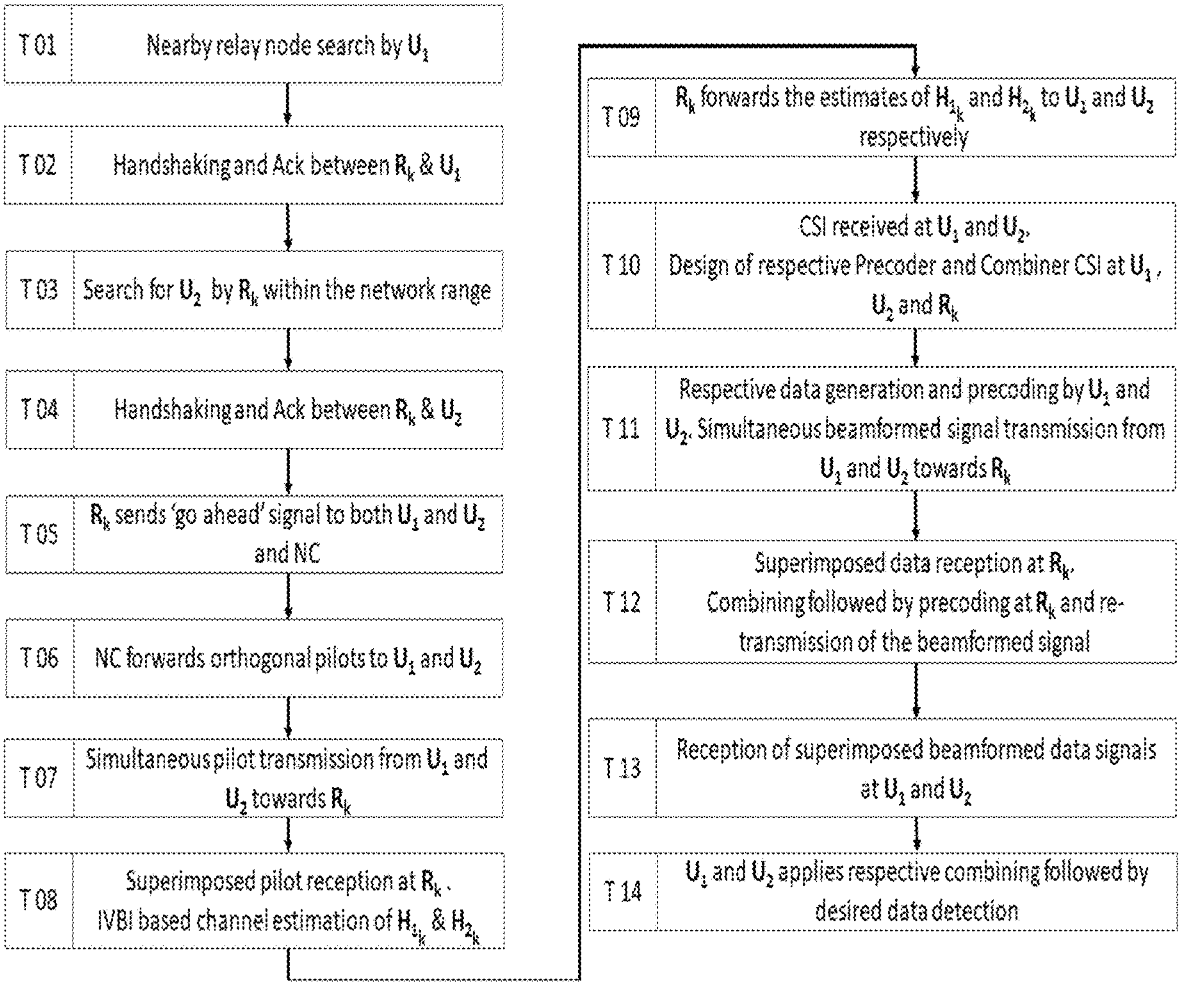

FIG. 2. Time-Flow diagram of the proposed system.

Figure 3:
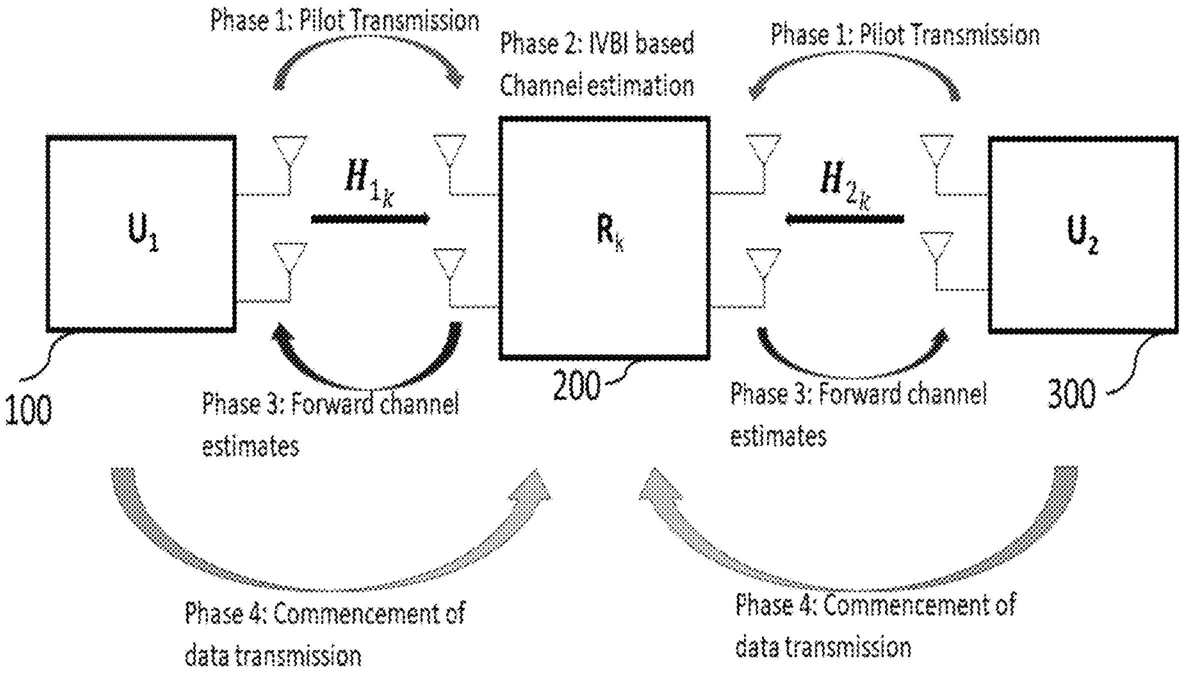

FIG. 3. System model of the proposed system.

Figure 4:
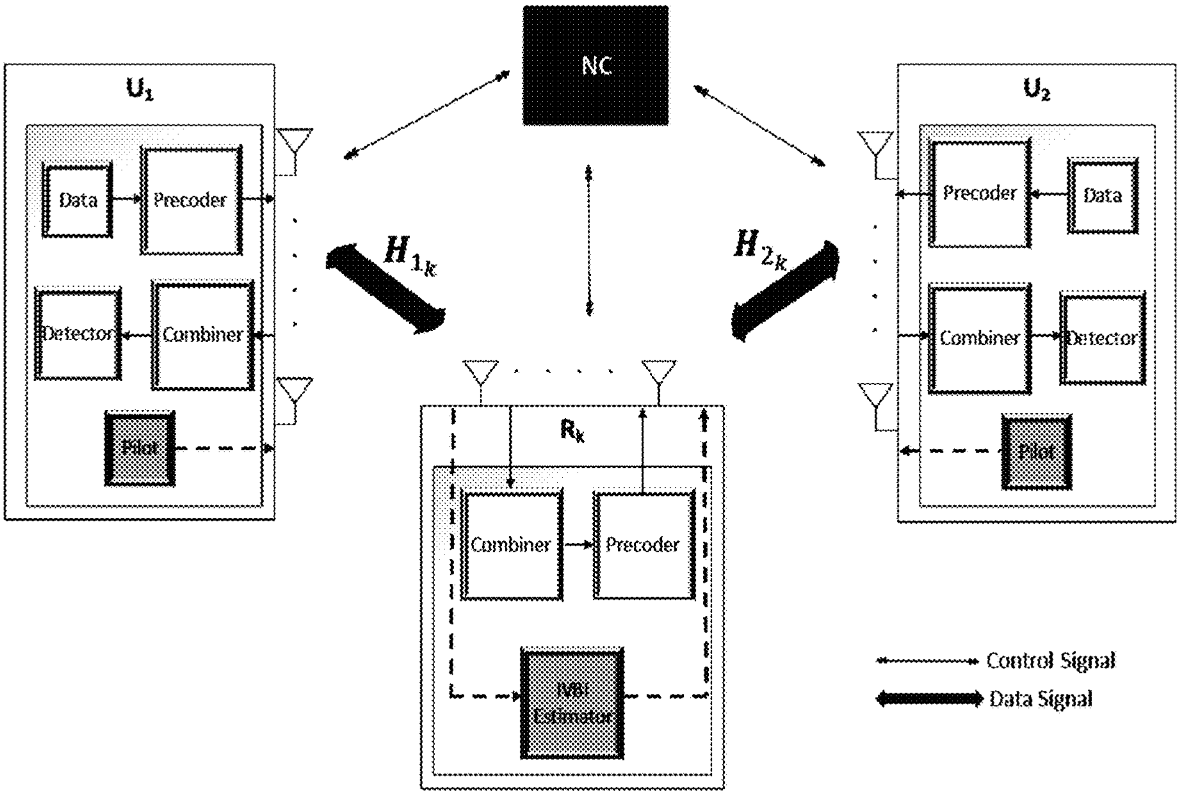

FIG. 4. Detailed block diagram of the proposed system.

Figure 5:
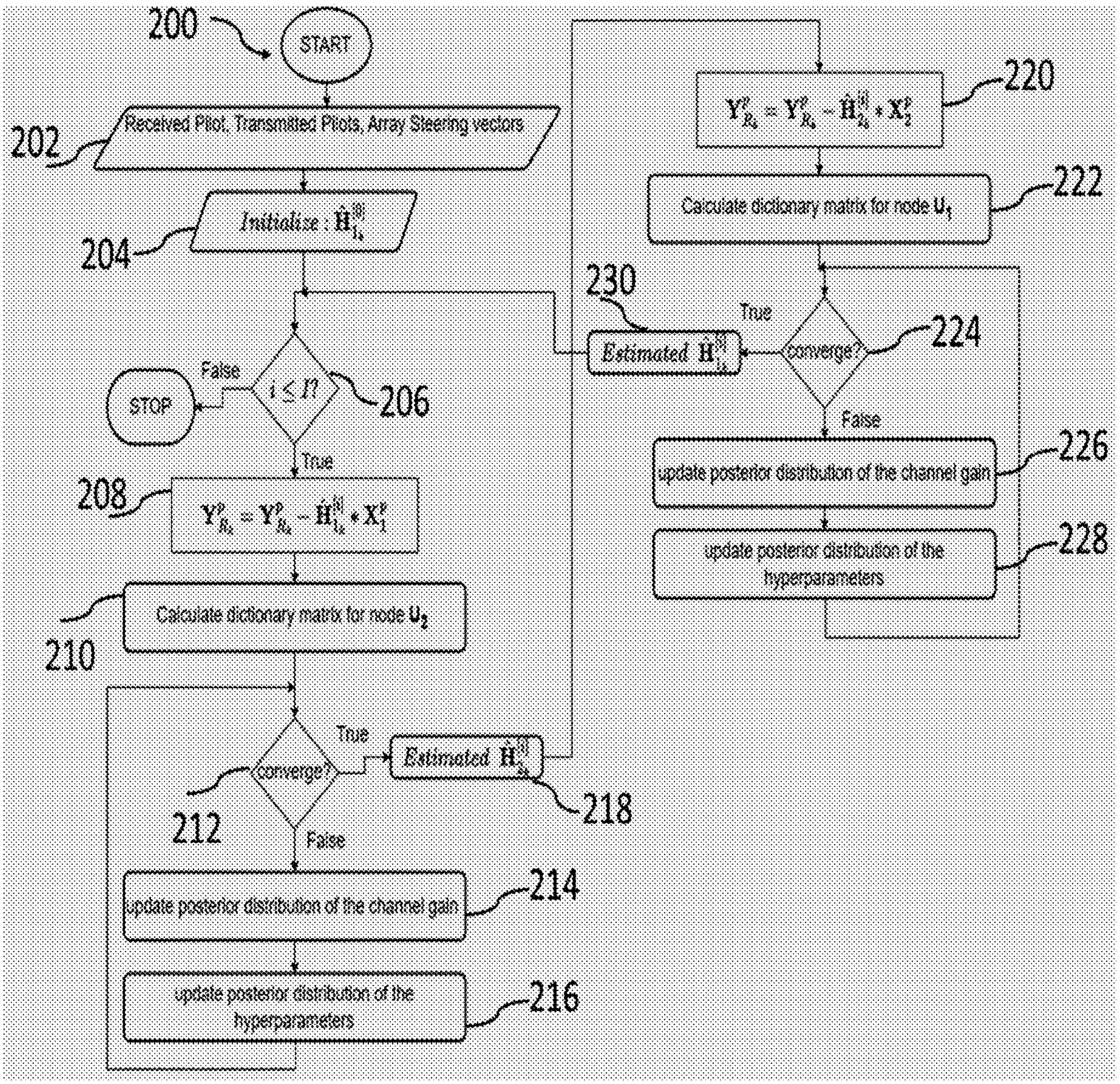

FIG. 5. Flowchart of the IVBI channel estimation method.

Figure 6:
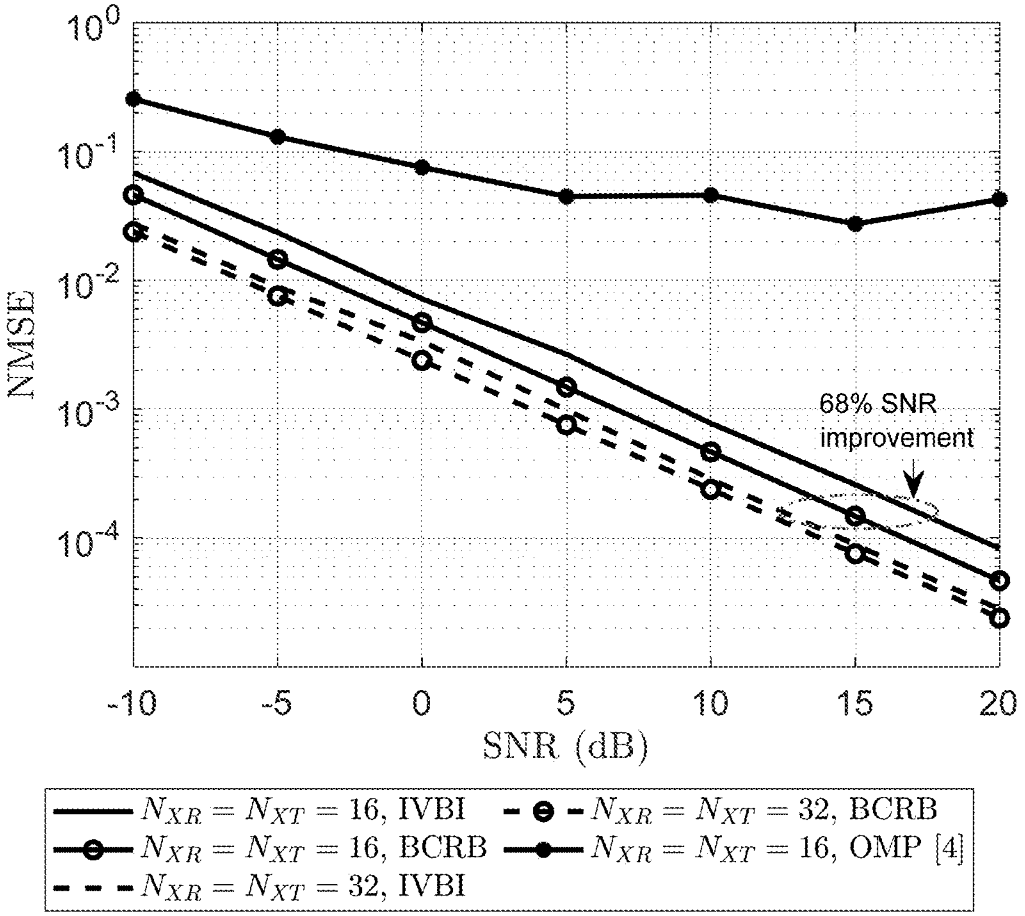

FIG. 6. NMSE of channel gains over SNR for different MIMO structure.

Figure 7:
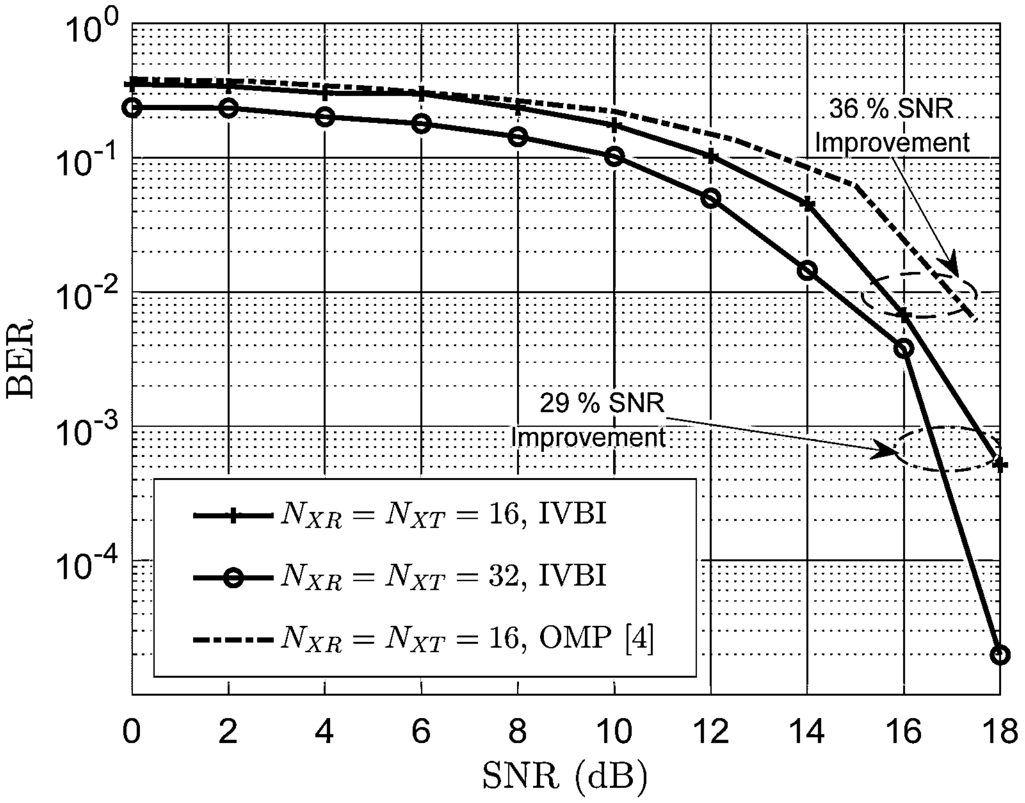

FIG. 7. BER vs SNR for different symmetrical MIMO structure.

Figure 8:
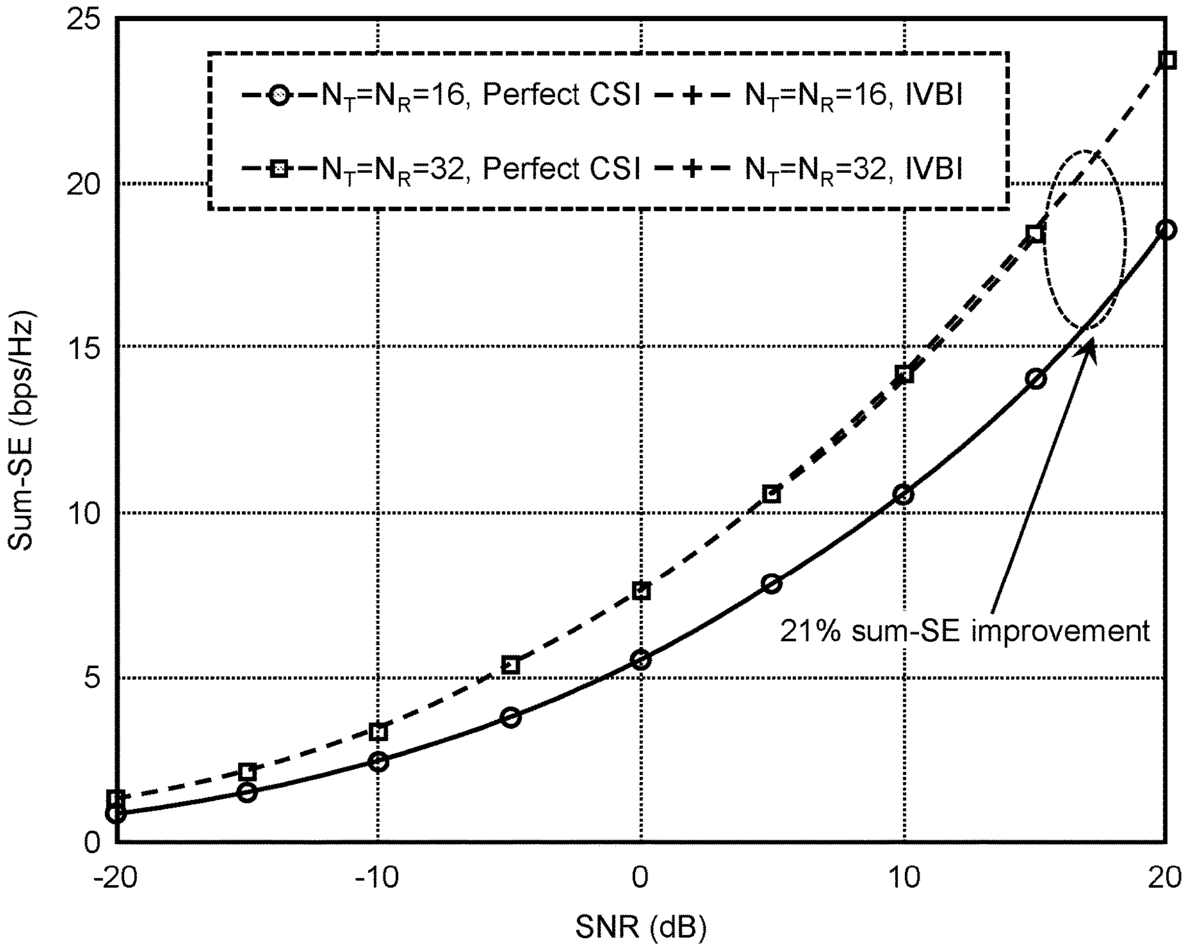

FIG. 8. sum-SE vs SNR for different MIMO structure.

DETAILED DESCRIPTION OF THE INVENTION WITH REFERENCE TO THE ACCOMPANYING DRAWINGS

As shown in FIG. 1, two vehicles, $U_1$ and $U_2$ wants to communicate with each other but there is no direct transmission between them due to the high shadowing and heavy path loss caused by the obstacles like building, trees etc. Hence, the two vehicles/nodes communicate via relay nodes, $R_k$, k=1, 2, . . . , K, present at the road-side. Each relay node is assumed to follow estimate and forward (EF) protocol. In EF approach of relaying, the relay forwards an estimate (soft information) of the signal transmitted by the source nodes towards the destination nodes without decoding the original signal. It is assumed that $H_{1_k}$ is the mmWave channel between $U_1$ and relay $R_k$ and $H_{2_k}$ is the mmWave channel between $U_2$ and relay $R_k$. Further, all the nodes are equipped with multiple antennas for transmission and reception. Each of the nodes are equipped with multi-antenna system.

FIG. 2 represents the time flow diagram of the system. Step T01 starts with the nodes $U_1$ searching for a nearby relay node $R_k$ in order to establish communication. In step T02, $U_1$ receives acknowledgement from $R_k$. On completion of handshaking between $R_k$ and $U_1$, $R_k$ searches $U_2$ in step T03. $R_k$ and $U_2$ undergoes handshaking in step T04. In step T05, $R_k$ sends 'go ahead' signal to $U_1$ and $U_2$ indicating start of communication. This information is also passed to the network controller (NC). NC in step T06, generates and communicates orthogonal pilot signals to $U_1$ and $U_2$. A pilot signal is a signal transmitted over a communication system for channel estimation, synchronization etc. The proposed system involves full-duplex (FD) mode of operation i.e., both the user nodes transmits the signal simultaneously. Hence, in step T07, both the nodes $U_1$ and $U_2$, initiate simultaneous transmission of pilot signals towards the relay node, $R_k$. The relay node, $R_k$, receives the superimposed pilot signals corrupted by in-between channels $H_{1_k}$, $H_{2_k}$ and noise in step T08.

Then, the relay node adopts the proposed iterative variational Bayesian inference (IVBI) based method in order to estimate the channels $H_{1_k}$ and $H_{2_k}$ in between nodes $U_1$ and $R_k$ and $U_2$ and $R_k$ respectively. Step T09 includes the dissemination of the estimated channel state information (CSI) to the nodes $U_1$ and $U_2$. As shown in step T10, respective CSI received by $U_1$ and $U_2$. With the help of the received CSI, precoders and combiners are designed at node. Next the two nodes, $U_1$ and $U_2$ initiates the data transmission phase by generating their respective data followed by precoding. Since the system operates in FD mode, thus, the precoded data are transmitted simultaneously by $U_1$ and $U_2$ towards the relay node in step T11. Step T12 involves reception of superimposed beamformed data at $R_k$. $R_k$ processes the superimposed data with the combiner followed by precoder in order to re-transmit the beamformed data signal towards $U_1$ and $U_2$. The superimposed beamformed data signal transmitted by $R_k$ is received by both $U_1$ and $U_2$ in step T13. Finally, at step T14, each node $U_1$ and $U_2$ applies corresponding combiners and detects their respective desired data.

According to the present invention shown in FIG. 3, two transceivers, 100 and 300 are engaged in communication via at least one relay node 200. The system has four phases. Phase 1 consists of simultaneous pilot transmission from 100 and 300 towards 200. A block of length $N_p$ pilot signals, $$X_1^p$$

and $$X_2^p,$$

are being transmitted respectively by transceiver nodes, 100 and 300. The relay node, 200, receives the pilot signals from both the nodes 100 and 300 corrupted by the respective channels $H_{1_k}$, $H_{2_k}$ and white Gaussian noise. Phase 2 comprises IVBI based estimation of channels $H_{1_k}$, $H_{d_k}$. The aim of the 200 is to estimate the channels $H_{1_k}$ and $H_{d_k}$. The channels $H_{1_k}$ and $H_{d_k}$ are estimated iteratively following the proposed IVBI channel estimator discussed below. In Phase 3, the estimated channel state information (CSI) is forwarded back by 200 to 100 and 300. Finally, the data transmission begins in Phase 4. FIG. 4 represents the detailed block diagram of the proposed system. Each transceiver (100, 300), as depicted in FIG. 4, has two main modules: a pilot module and a data module. The pilot module features a pilot signal generator. The pilot signal transmitted by each transceiver is then corrupted by the corresponding channels $H_{1_k}$ or $H_{d_k}$. On reception of the superimposed pilot signals, the relay node (200) performs the channel estimation following the proposed IVBI method. On completion of the channel estimation, the corresponding CSI is forwarded by 200 to 100 and 300. The data module is then activated for all the nodes where each transceiver (100 and 300) generates its respective data followed by hybrid beamformation using precoders generated from the CSI. On reception of superimposed data signals from the transceivers (100, 300), 200 retransmits the received signal towards 100 and 300 after performing combing followed by precoding. The data signal thus received by each transceiver (100, 300) undergoes corresponding combing. Finally, each transceiver (100, 300) detects its respective data symbols.

Iterative Variational Bayesian Inference (IVBI) Based Channel Estimation (Phase 2):

IVBI adopts alternative minimization method for channel estimation, in which, one particular channel is estimated considering the other channel to be known and vice versa as shown in FIG. 5. In IVBI method, $$Y_{R_k}^P$$

is the pilot signal received by the relay, 200. The transmitted pilot signals $$X_1^p, X_2^p$$

and the corresponding array steering vectors are assumed to be known. First the estimated channel $$\hat{H}_{1_k}^{[0]}$$

in 204 is initialized. The method involves iterative process 206 of iteration length, I. In 208, with the help of $$\hat{H}_{1_k}^{[0]},$$

the effect $$X_1^p$$

is being removed from the received pilot signal, $$Y_{R_k}^P$$

followed by the computation of the dictionary matrix of $U_2$, 210.

Using the dictionary matrix and the effective received pilot signal, the posterior distribution of the channel gain for $$\hat{H}_{2_k}^{[i]},$$

214, is being updated based on 216 i.e. the updated posterior distribution of the hyperparameters iteratively until convergence 212 is achieved. Once convergence is achieved, the $i^{th}$ estimate $$\hat{H}_{2_k}^{[i]}$$

i.e. 218 is obtained. The impact of $$X_2^p$$

is removed i.e. 220 from received pilot signal, $$Y_{R_k}^P$$

using the estimate $$\hat{H}_{2_k}^{[i]},$$

222 calculates the dictionary matrix for $U_1$. With the help of the dictionary matrix and the effective received pilot signal 226 evaluates the updated posterior distribution of channel gain $$\hat{H}_{1_k}^{[i]}$$

followed by 228, i.e. the update of the posterior distribution of the hyperparameters. The process repeats until convergence 224 is achieved. After convergence 224, the $i^{th}$ estimate the channel $$\hat{H}_{1_k}^{[i]}$$

is obtained. Finally, the previous estimates are updated for both the channels using the current estimates i.e.

$$\hat{H}_{2_k}^{[i+1]} = \hat{H}_{2_k}^{[i]}$$

and $$\hat{H}_{1_k}^{[i+1]} = \hat{H}_{1_k}^{[i]}.$$

The final estimated channels $\hat{H}_{1_k}$ and $\hat{H}_{2_k}$ are then forwarded to the source nodes $U_1$ and $U_2$ (i.e. 100 and 300) using control channel as shown in Phase 3. Then, Phase 4 of the system is initiated that includes the transmission of the actual data phase the details of which is discussed in the next section.

Data Transmission—Phase 4:

Two time slots are allotted for one round of data exchange. It is assumed that all nodes adopt a hybrid analog and digital MIMO structure. The precoding structure consists of the radio frequency (RF) portion, baseband (BB) portion with phase shifters and BB processors. Each RF chain is connected to all the antennas. At node $U_1$, the numbers of transmitting antennas and receiving antennas are $N_{1T}$ and $N_{1R}$, respectively. The number of transmitting and receiving RF chains are $M_{1T}$, and $M_{1R}$, respectively. The number of data streams is $N_{1S}$. Similarly, $N_{2T}$, $N_{2R}$, $M_{2T}$, $M_{2R}$ and $N_{2S}$ are the corresponding parameters of node $U_2$. $N_{RT_k}$, $N_{RR_k}$, $N_{RR_k}$, $M_{RTk}$, $M_{RR_k}$ and $N_{RS_k}$ are the corresponding parameters of the $R_k$ relay node. The precoders and combiners to perform hybrid beamforming are designed from the estimated channels $\hat{H}_{1_k}$ and $\hat{H}_{2_k}$. First data from transceiver nodes $U_1$ and $U_2$, i.e. $x_1$ and $x_2$, are being precoded by the respective BB and RF precoders and transmitted towards relay node. Although it is assumed that multiple receive beams are produced by the relay node to receive signals from each source, but there is possibility of beam overlapping due to the wider in nature of the receive antenna beams. Hence, superimposed signals from the transceiver nodes is received by the relay node. At the relay node $R_k$, the signal is then processed by the RF and BB combiners followed by BB and RF precoders respectively. $R_k$ retransmits the processed signal towards the individual transceivers. On reception of the relay transmitted signal at the respective transceiver, $U_1$ and $U_2$, the corresponding RF and BB combining is performed followed by the desired data detection.

Performance Analysis:

This section presents the simulation results to evaluate the performance of the proposed system for TWR mmWave system. The system is being simulated on MATLAB platform and the parameters used for the analysis is being reported in Table 1. We have assumed that each node of the TWR mmWave system is deployed with $N_{XT}=N_{XR}\in(16,32)$ where $X\in\{1, R, 2\}$ transmit and the receive antenna elements and the grid size of the feasible sets of angles of arrival (AoAs) and angle of departure (AoDs) of the dictionary matrix $G_{XT}=G_{XR}\in(16,32)$. The distance between neighbouring antenna elements is assumed to be half the wavelength corresponding to the frequency. The number of data streams and RF chains in each node is assumed to be $N_{XS}$ and $M_{XT}=M_{XR}\in(4,8)$ respectively. The mmWave channels are generated according to the geometric channel model, where the number of clusters $N_{cl}=4$. The complex path gains ai corresponding to the Ith scatterer is modelled as independent and identically distributed (i.i.d)~CN(0,1). It is also assumed that the mmWave MIMO channel is ideal in nature with no grid mismatch. The simulation results are averaged over 1000 Monte-Carlo iterations.

TABLE 1

Simulation Parameter

| Parameter | Description | Value |
|---|---|---|
| $N_{1T} = N_{2T} = N_{RT} = N_{XT}$ | Number of antenna elements in transmit antenna | (16, 32) |
| $N_{1R} = N_{2R} = N_{RR} = N_{XR}$ | Number of antenna elements in receiver antenna | (16, 32) |
| $G_{1T} = G_{2T} = G_{RT} = G_{XT}$ | Grid size of AoA | (16, 32) |
| $G_{1R} = G_{2R} = G_{RR} = G_{XR}$ | Grid size of AoD | (16, 32) |
| $M_{1T} = M_{2T} = M_{RT} = M_{XT}$ | Number of transmit Radio Frequency chains | (4, 8) |
| $M_{1R} = M_{2R} = M_{RR} = M_{XR}$ | Number of receive Radio Frequency chains | (4, 8) |
| $N_{1s} = N_{2s} = N_{RS}$ | Number of data streams | 4 |
| $N_p$ | Length of Pilot | 150 |
| $N_{cl}$ | Number of scatterer | 4 |
| Modulation | | Quadrature Phase Shift Keying (QPSK) |
| Pilot sequence | | Zadoff-Chu (ZC) |

To evaluate the performance of the proposed IVBI algorithm following metrics are considered. At first, NMSE is being evaluated at different SNR. For the purpose of comparison, we have used the state-of-the-art estimator orthogonal matching pursuit (OMP) where the results are regenerated as per our simulation environment. We also illustrate the BER performance of the TWR mmWave system.

Furthermore, the end-to-end sum spectral efficiency (sum-SE) evaluation of the system is also being assessed followed by the computational complexity. We refer the mmWave MIMO structures with $N_{XR}=N_{XT}\in(16,32)$ as 16×16 MIMO, 32×32 MIMO respectively.

NMSE performance of IVBI estimator: The performance of NMSE versus SNR over different MIMO structure is shown in FIG. 6. The length of pilot is set at $N_p=150$. For comparison purpose, conventional OMP based algorithms are also adopted for estimation of the channel gains in our simulation environment. It can be observed that the proposed IVBI estimator with 16×16 MIMO configuration, attains NMSE of $10^{-3}$ at 10 dB whereas OMP is able to achieve NMSE of nearly $10^{-2}$. Hence, 92% improvement in SNR performance can be achieved by the proposed method with respect to the state-of-the-art method. Furthermore, higher antenna structure i.e. 32×32 MIMO is able to achieve NMSE of $2*10^{-4}$ at 20 dB SNR. Hence, the 32×32 MIMO structure is able to attain 68% SNR improvement in NMSE performance compared to the 16×16 MIMO configuration. The proposed estimator also approaches the corresponding Bayesian Cramér-Rao Bound (BCRB) more closely as the size of MIMO is being increased from 16×16 to 32×32 MIMO structure.

BER performance of the TWR mmWave system: The next metric examined for performance evaluation of the system is bit error rate (BER). The BER performance of the system for different MIMO configuration is shown in FIG. 7. For 16×16 MIMO configuration, OMP estimators attains BER of nearly $10^{-2}$ whereas BER achieved using IVBI is $10^{-3}$ at 17 dB SNR. In order to achieve BER of $10^{-2}$ for 16×16 MIMO systems, IVBI provides nearly 36% SNR improvement as compared to prior art method (i.e. OMP). It is worth noting that our proposed IVBI achieves the higher accuracy as compared to existing methods, which is further observed on the BER performance of the system. Furthermore, BER performance is considered for higher MIMO structure as well. It is seen that increment of MIMO structure size i.e. from 16×16 to 32×32, leads to 29% SNR improvement to attain BER of $10^{-3}$. Therefore, the increased number of antennas leads to slight improvement of BER performance.

End-to-end sum-SE performance of the TWR mmWave system: The next performance metric considered is the sum-SE of the end-to-end system achieved by the proposed channel estimation method. The sum-SE vs SNR for different MIMO configuration is plotted in FIG. 8. The 21% sum-SE improvement can be observed with the increase in MIMO configuration, i.e. 16×16 achieves sum-SE of 19.08 bps/Hz whereas 24.12 bps/Hz is achieved for 32×32. Furthermore, the sum-SE with estimated channels using IVBI, is being compared with perfect CSI case. The sum-SE achieved with estimated channel is nearly equal to the sum-SE achieved with perfect channel for all the MIMO configurations.

Complexity Comparison: Computational complexity is defined as the number of complex multiplications and additions in the algorithm. The computational complexity of IVBI for estimating the channel gains at each iteration is expressed as $O(G^3_{XR}G^3_{XT})$. The computational complexity for estimating the channel gains using OMP for each iteration is given as, $O(G_{XR}G_{XT}N_{XR}N_p)$ compared to the complexity of $O(G^3_{XR}G^3_{XT})$ for the proposed estimator. Hence, the proposed estimator involves higher computational complexity resulting in the improved performance in terms of NMSE and BER.

REFERENCE

[1] C. He, Y. Wan, L. Zhao, H. Lu and T. Shimizu, "Sub-6 GHz V2X-Assisted Synchronous Millimeter Wave Scheduler for Vehicle-to-Vehicle Communications," in IEEE Transactions on Vehicular Technology, vol. 71, no. 11, pp. 11717-11728, November 2022.

[2] T. Zugno, M. Drago, M. Giordani, M. Polese and M. Zorzi, "Toward Standardization of Millimeter-Wave Vehicle-to-Vehicle Networks: Open Challenges and Performance Evaluation," in IEEE Communications Magazine, vol. 58, no. 9, pp. 79-85, September 2020.

[3] L. Montero, C. Ballesteros, C. Marco, L. Jofre, "Beam management for vehicle-to-vehicle (V2V) communications in millimeter wave 5G," in Vehicular Communications, vol. 34, 2022.

[4] J. Lee, et al., "Channel Estimation via Orthogonal Matching Pursuit for Hybrid MIMO Systems in Millimeter Wave Communications," in IEEE Transactions on Communications, vol. 64, no. 6, pp. 2370-2386, June 2016.

We claim:

1. A method for establishing vehicle to vehicle communication involving two-way relay network (TWRN), the method comprises the steps of:

searching at least one nearby relay node involving transceiver nodes of a first vehicle to establish a communication;

receiving acknowledgement from said nearby relay node by the first vehicle transceiver nodes and thereby completing a handshaking between the first vehicle transceiver nodes and the relay node;

identifying transceiver nodes of a second vehicle involving said relay node and thereby completing a handshaking between the second vehicle transceiver nodes and the relay node;

sending signals to the first and the second vehicle transceiver nodes involving the relay node indicating start of communication and passing said signals to a control channel;

generating and communicating orthogonal pilot signals from the relay node to the first and the second vehicle transceiver nodes enabling the first and the second vehicle transceiver nodes to initiate simultaneous transmission of further pilot signals towards the relay node;

receiving the further pilot signals by the relay node which are corrupted in a first channel between the first vehicle transceiver nodes and the relay node and a second channel between the second vehicle transceiver nodes and the relay node;

iterative variational Bayesian inference (IVBI) based estimation of the first and the second channels at the relay node and dissemination of estimated channel state information (CSI) to the first and the second vehicle transceiver nodes;

receiving respective CSI by the first and the second vehicle transceiver nodes and designing precoders and combiners therein based on the CSI;

initiating the first and the second vehicle transceiver nodes for data transmission phase by generating their respective data followed by precoding the data, whereby precoded data are transmitted simultaneously by the first and the second vehicle transceiver nodes towards the relay node as superimposed beamformed data;

reception of the beamformed data at the relay node and processing the beamformed data using a relay node combiner followed by a relay node precoder in order to re-transmit the beamformed data towards the first and the second vehicle transceiver nodes;

receiving the beamformed data transmitted by the relay node at the first and the second vehicle transceiver nodes, whereby each first and the second vehicle transceiver nodes applies corresponding combiners and detects their respective desired data.

2. The method as claimed in claim 1, wherein each transceiver node includes a transceiver having a pilot signal generator, a transmitter section, and a receiver section; and multiple antennas for transmission and reception.

3. The method as claimed in claim 1, wherein the relay node includes IVBI based channel estimator that estimates the channels between the transceiver nodes and the relay node by adopting alternative minimization method for channel estimation, in which, one of the channels is estimated considering other of the channels to be known and vice versa.

4. The method as claimed in claim 3, wherein the IVBI based estimation of the first and the second channels operates based on the relay node information on the transmitted pilot signals and corresponding array steering vectors, whereby the channel estimation includes initializing an estimate for the first channel;

removal of effect of transmitted pilot signal by the first transceiver node from corresponding received pilot signal at the relay node with help the initial estimate of the first channel followed by computation of a second dictionary matrix of second transceiver node;

involving the second dictionary matrix and the received pilot signal to update posterior distribution of channel gain for the second channel based on updated posterior distribution of hyperparameters iteratively, until convergence is achieved and once convergence is achieved, the second channel is estimated;

removing impact of transmitted pilot signal by the second transceiver node from corresponding received pilot signal at the relay node with help the estimated second channel;

calculating a first dictionary matrix for the first transceiver node;

involving the first dictionary matrix and the effective received pilot signal at the relay node from the second transceiver node to evaluates updated posterior distribution of channel gain for the first channel followed updating the posterior distribution of the hyperparameters and repeating process, until convergence and after convergence, the first channel is estimated;

updating previous estimates for both the channels using the current estimates; forwarding the final estimated channels to the transceiver nodes using control channel for subsequent initiation of the transmission of actual data phase.

* * * * *